May 14, 1968  R. B. WALTERS  3,383,540
PROJECTION LAMP WITH MULTIPLE REFLECTORS
Filed April 4, 1966
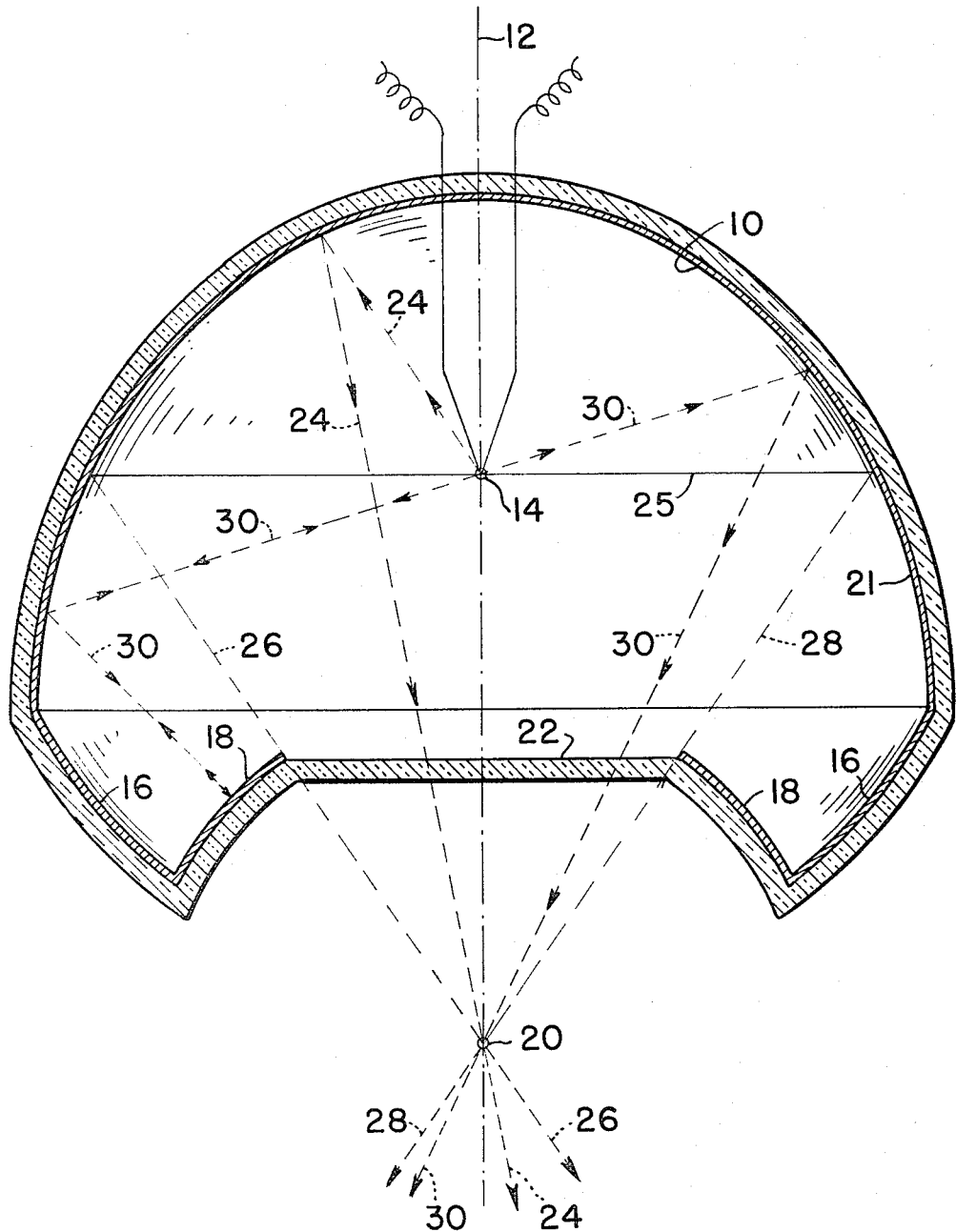
INVENTOR.
Richard B. Walters
BY
William D. Fosdick
AGENT 3,383,540
PROJECTION LAMP WITH MULTIPLE
REFLECTORS
Richard B. Walters, Addison, N.Y., assignor to Corning Glass Works, Corning, N.Y., a corporation of New York
Filed Apr. 4, 1966, Ser. No. 539,972
4 Claims. (Cl. 313—114)

This invention relates to projection lamps, and more particularly to such lamps which utilize combinations of reflecting surfaces to provide controlled light distribution.

It is an object of the present invention to provide a lamp having the ability to emit substantially all of its light within a preselected range of angles about the axis of the projected beam.

This and other objects, which will be apparent from the detailed description of the invention, are accomplished by the provision of a lamp having a reflector formed in at least two sections, one section being an ellipsoidal section having a light source at its principal focus, and the other section being a spherical section having its center at the conjugate focus of the ellipsoidal section, the spherical surface being located so as to intercept and return along their incident paths light rays which fall directly from the light source on the ellipsoidal reflector section at a location intermediate the conjugate focus and a plane through the principal focus perpendicular to the axis of the ellipsoidal section.

The invention will be described with reference to the accompanying drawing, which is an axial sectional view of the lamp of the invention.

Referring to the drawing, the lamp comprises a reflector section 10 in the form of a portion of an ellipsoid of revolution about axis 12. The ellipsoidal section is formed by rotating a plane ellipse about its major axis, which coincides with axis 12. A light source, or filament, 14 is located at the principal focus of the ellipsoidal section. Adjoining the ellipsoidal section is a reflector section 16 in the form of a portion of a sphere having its center at light source 14, i.e., at the principal focus of ellipsoidal reflector section 10. Adjoining reflector section 16 is a second reflector section 18 in the form of a portion of a sphere having its center of curvature at conjugate focus 20 of the ellipsoidal reflector section. Each reflector section comprises a glass base having thereon a silver coating 21. At the center of the second spherical reflector section is a transparent section 22 through which light is emitted from the lamp.

As is well known, light rays originating at one focus of an ellipsoidal surface and reflected by the surface are directed through the conjugate focus of the surface. Thus, light rays such as ray 24 are reflected from the inner surface of ellipsoidal reflector section 10 through transparent section 22 and out of the lamp through conjugate focus 20. The boundary between spherical reflector section 18 and transparent section 22 is defined by the cone of light rays reflected by section 10 after having been emitted from source 14 in a plane 25 perpendicular to axis 12. Such rays are represented by rays 26 and 28. Therefore, all rays emitted from source 14 and falling on reflector section 10 at a location on the same side of plane 25 as conjugate focus 20 are reflected by reflector section 10 onto reflector section 18. Since all light rays emitted from source 14 and falling on ellipsoidal reflector section 10 are directed towards the conjugate focus 20, and since reflector section 18 is in the form of a portion of a sphere having its center at conjugate focus 20, rays such as ray 30 pass in radial directions with regard to reflector surface 18 and are therefore directed back along their original path through light source 14 and subsequently fall upon ellipsoidal reflector section 10 at a location on the side of plane 25 opposite the conjugate focus. Such rays, after being reflected once again by section 10, pass through transparent section 22 and out of the lamp. Thus, the maximum spread which is imparted to the reflected beam of light corresponds with the angle between rays 26 and 28 subsequent to their reflection by surface 10. All light rays emitted on the side of plane 25 on which conjugate focus 20 is located, which rays, if they were emitted from the lamp directly after reflection from surface 10, would have the maximum spread with regard to the longitudinal axis of the lamp, are redirected back along their paths to be emitted from the lamp in the same manner as rays falling on reflector section 10 on the opposite side of plane 25. Thus, there results a light pattern having a limited spread.

Since reflector section 16 is in the form of a portion of a sphere having its center of curvature at the light source, all light rays falling directly from the light source thereon will be redirected back through the light source and onto reflector section 10 on the side of plane 25 opposite the conjugate focus. Such rays will then be directed by section 10 toward conjugate focus 20.

If broader light spread is desired, reflector section 18 may be made to extend from reflector section 16 in the direction of axis 12 by a smaller amount, thereby permitting the passage of rays emitted at small angles from plane 25 in the direction of conjugate focus 20. It is not practical for reflector section 18 to extend beyond the line defined by the cone of light rays emitted along plane 25 and reflected by section 10, since a result would be that light rays emitted on the side of plane 25 opposite the location of the conjugate focus would be reflected by section 18 back along their original paths through light source 14 so as to fall on reflector section 10 at locations on the same side of plane 25 as the conjugate focus. Since such rays would then once again be reflected back along their previous paths by section 18, such rays would never emerge from the lamp.

Spherical reflector section 16 is not essential to the lamp. For certain lamp configurations, i.e., those in which an ellipsoidal reflector section of high eccentricity is utilized, section 16 may be transparent. Similarly, section 16 may be completely absent, and sections 10 and 18 may join one another, particularly when ellipsoidal section 10 is of high eccentricity.

The above discussion of the optical features of the lamp of the invention is predicated on the assumption that the light source is a point. Since the light source is of finite dimensions, not all the light emitted thereby is emitted from the principal focus of the ellipsoidal section of the reflector, and, accordingly, not all such light will be directed precisely through the conjugate focus. Similarly, light rays reflected back toward the light source by the reflector sections will not pass precisely through the principal focus. This fact increases the luminous efficency of the lamp, inasmuch as such reflected rays are less likely to be blocked or scattered by the filament. In order to prevent blocking or scattering of rays emitted from the precise principal focus, slight longitudinal flutes, or corrugations, may be imposed on the reflector sections to cause the reflected rays to pass around the filament.

The lamp of the invention has been illustrated as being of the "sealed beam" type, wherein the entire interior of the envelope is evacuated and light source 14 is in the form of a bare filament. The light source could equally well be formed as a separate bulb, located within an enclosure formed by the reflector sections. In such case, transparent envelope section 22 might be an aperture.

It will be appreciated that further variations may be made within the scope of the invention. Accordingly it is intended that the scope of the invention be limited only by the scope of the appended claims.

I claim:

1. A lamp comprising a first reflector section in the form of a portion of an ellipsoid of revolution about an axis, a light source on said axis at the principal focus of said ellipsoid of revolution, a second reflector section in the form of a portion of a sphere having its center of curvature on said axis at the conjugate focus of said ellipsoid of revolution and having an aperture along said axis, said second reflector section being convex in the direction of said first reflector section and extending in the direction of said axis not substantially farther than the cone defined by light rays emitted from said light source in a plane perpendicular to said axis and reflected toward said conjugate focus by said first reflector section, and a light-transmitting area within said aperture in said second reflector section.

2. A lamp according to claim 1 in which said second reflector section extends in the direction of said axis by an amount sufficient to reflect substantially all rays emitted from said light source on the side of said plane nearer said conjugate focus and reflected toward said second reflector section by said first reflector section.

3. A lamp according to claim 1 in which said first and second reflector sections are joined by a third reflector section in the form of a portion of a sphere having its center at said principal focus of said first reflector section.

4. A lamp according to claim 3 in which said light source is a filament located within a continuous enclosure comprising said first, second and third reflector sections and said light-transmitting area.

References Cited

UNITED STATES PATENTS 3,253,255   5/1966   Nagel _____ 88—24

JAMES W. LAWRENCE, *Primary Examiner.*

P. C. DEMEO, *Assistant Examiner.*